United States Patent [19]

Dorsey et al.

[11] 3,831,054

[45] Aug. 20, 1974

[54] STORAGE TUBE ERASE CONTROL

[75] Inventors: Denis Peter Dorsey, Levittown, Pa.; William E. Rodda, Trenton, N.J.

[73] Assignee: RCA Corporation, New York, N.Y.

[22] Filed: Mar. 23, 1973

[21] Appl. No.: 344,069

[30] Foreign Application Priority Data

Apr. 24, 1972 Great Britain .................... 19014/72

[52] U.S. Cl. .............. 315/12, 315/13 ST, 313/68 D

[51] Int. Cl. ............................................ H01j 29/70

[58] Field of Search ................................ 315/10–12, 315/13 ST, 27 R; 313/66, 67, 68 R, 68 D; 307/246

[56] References Cited

UNITED STATES PATENTS 3,633,064 1/1972 Herman ................................ 315/12

3,657,595 4/1972 Bressler et al. ................... 315/13 ST 3,751,688 8/1973 Hooghordel .......................... 315/12

*Primary Examiner*—Maynard R. Wilbur

*Assistant Examiner*—J. M. Potenza

*Attorney, Agent, or Firm*—Eugene M. Whitacre; Charles I. Brodsky

[57] ABSTRACT

Storage tubes are typically operated in either ERASE, WRITE, or READ modes. In accordance with the invention, there is provided a hybrid mode of operation, incorporating characteristics of both WRITE and READ control, to enhance the removal of previously stored charge patterns during image ERASE operation.

4 Claims, 1 Drawing Figure

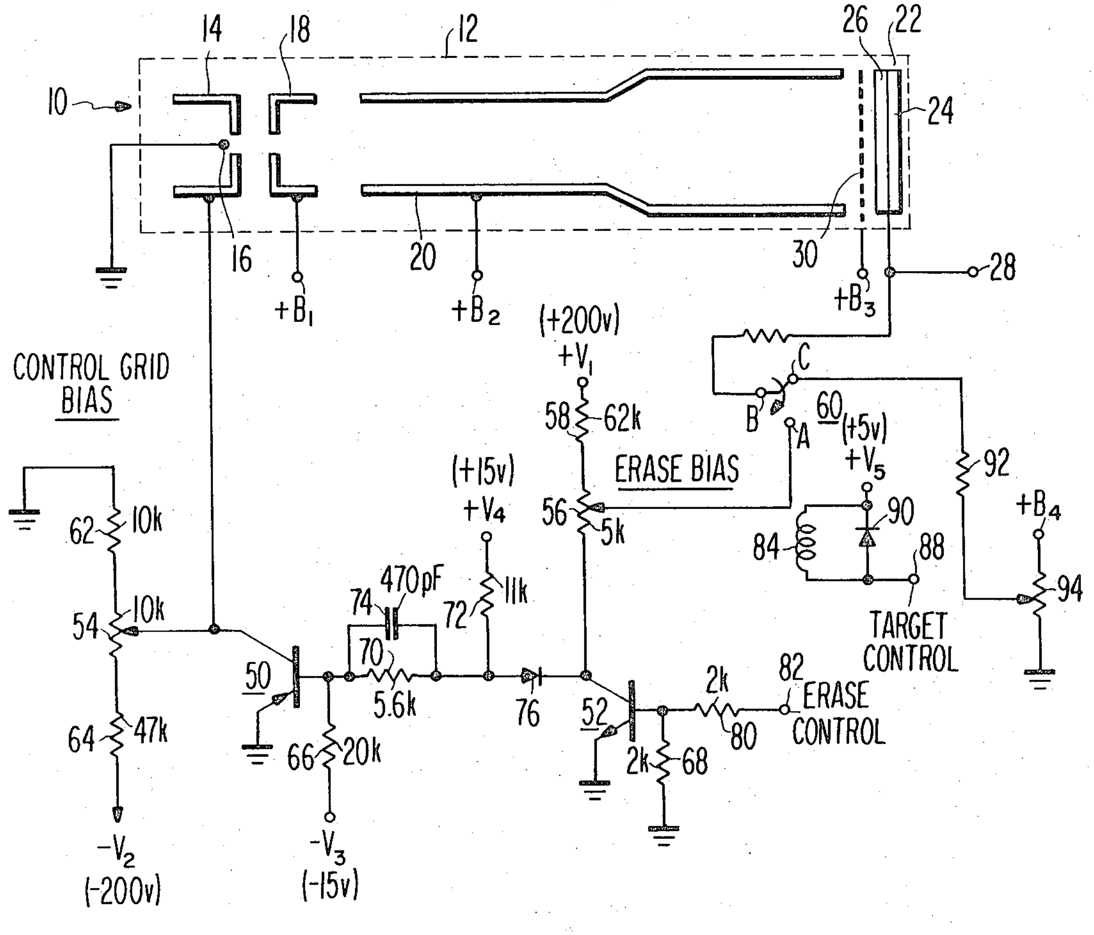
10
12
14
16
18
20
22
24
26
28
30
+B1
+B2
+B3
+B4
CONTROL GRID BIAS
ERASE BIAS
(+200v) +V1
58 62k
56 5k
(+15v) +V4
72 11k
74 470pF
70 5.6k
76
50
52
62 10k
54 10k
64 47k
-V2 (-200v)
66 20k
-V3 (-15v)
2k 68
2k 80
82 ERASE CONTROL
60 (+5v) +V5
A
B
C
84
90
88
TARGET CONTROL
92
94

STORAGE TUBE ERASE CONTROL

FIELD OF THE INVENTION

Pending U.S. Patent Application Ser. No. 257,412, filed May 26, 1972, and entitled "TELEPHONE IMAGE TRANSMISSION SYSTEM" describes a system which is capable of transmitting still television pictures of three-dimensional objects over communications channels such as long-distance unequalized voice-grade telephone lines. A television camera is therein employed to continually provide a video signal to a storage tube in which any one video frame of information can be "frozen". The single frame stored—i.e., the picture to be transmitted—is then converted to an audio frequency signal for transmission over telephone type communications links to a remote receiver location, where a second storage tube is used to store the audio frequency information transmitted. Upon completion of the transmission, the audio information stored at the receiver is converted back to a video signal for viewing on a monitor. The transmitted signal is essentially frequency modulated, in that its instantaneous frequency is directly proportional to the brightness level of the stored picture elements then being transmitted.

Such a transmission system has been termed "simplex", in that transmissions always travel in the same direction along the telephone link. In a "half-duplex" system, on the other hand, transmissions can proceed in either direction, but not simultaneously. Experimentation has shown that system performance can be enhanced when an additional hybrid mode of operation is added to the typical ERASE, WRITE and READ modes of operation employed with such storage tube control.

To be more specific, when the storage tube is used to record television information—either in the "freezing" of a television frame for transmission or in the "re-creating" of that transmission received from the telephone line—that recording process establishes a charge pattern distribution on the insulator surfaces of the target which varies from element to element. Such charge distribution is retained during the recovery of the information—i.e., during the READ mode of operation—because of the non-destructive nature of the storage tube construction.

One method previously employed to erase this image information is to scan the insulator elements with a medium velocity, high current unmodulated beam for upwards of ten television frames. However, it has been noted that because of the different potentials existent throughout the distribution of charges in the stored pattern, the insulator elements would not all be placed at the same potential at the end of this scanning procedure. A residual charge would thus remain on the insulator elements, and would result in a definite background shading for images subsequently written into storage.

SUMMARY OF THE INVENTION

As will become clear hereinafter, the present invention comprises apparatus for preceding the normal ERASE mode of operation with a hybrid mode. As will be seen, in this hybrid mode, the substrate of the storage tube target is maintained at a potential comparable to that which is applied during the WRITE mode of operation, whereas the control grid of the storage tube is biased to the typical READ potential. By scanning the target with an unmodulated beam for some one or two television frames in this mode, the effect will be to over-write into the storage tube in a manner to place all insulator elements at substantially the same potential. When this mode is followed with the typical ERASE procedure, all insulator elements will start at the same potential and will subsequently end up at the same potential after the medium velocity, high current ERASE scanning. Because this last potential will effectively be the same as cathode potential, little residual charge would result for the background shading of subsequently recorded image informations.

BRIEF DESCRIPTION OF THE DRAWING

These and other features of the present invention will be clearly understood from a consideration of the following description taken in connection with the accompanying drawing which shows a preferred embodiment of hybrid-erase control apparatus for a storage tube constructed in accordance with the invention.

DETAILED DESCRIPTION OF THE DRAWING

The storage tube of the drawing is represented by the reference numeral 10, and comprises an envelope 12, a control grid 14, a cathode 16, an accelerating anode 18, a wall or focus anode 20, a target 22 which comprises a substrate 24 and a mosaic layer 26, an output terminal 28 and a collector mesh 30. The target of the storage tube 22 may, in one construction, consist of a coplanar array of silicon dioxide insulators 26 on a relatively square "P"-type silicon wafer 24, on which, using standard photo-lithographic techniques, it is possible to etch approximately 600,000 of these elements per square centimeter. Each element can be selectively charged by controlling the electron beam directed at it from the cathode 16.

Once a particular charge pattern is established on the insulator elements, the charge is essentially non-destructive and can be utilized to modulate another fixed bias electron beam directed to the substrate from the cathode 16. To afford this READ mode of operation, it is necessary to prepare the target surface, charge the insulators 26 by controlling the beam in a WRITE operation and switch the substrate 24 to a potential that will permit the charge to remain.

When the target 22 is being scanned by the electron beam in the READ mode, the silicon dioxide insulators 26 will be negative with respect to the cathode of the storage tube 16. The charge distribution on the insulating surface will then be a function of the stored image laid down during the WRITE operation and of the substrate bias. As the beam scans across the target 22, the total number of electrons reaching the substrate 24 will be inversely proportional to the negative charge on the insulators 26. For example, in a typical storage tube utilized with a READ potential of +8 volts on the substrate 24 and −35 volts on the grid 14, an insulator potential of −4 volts might prevent any electrons from reaching the substrate. Those electrons which are repelled by the insulator surface 26 will then be attracted to the separate mesh grid 30, while those electrons that reach the target substrate 26 form the signal current of the storage tube developed at output terminal 28.

Because the insulator 26 is negative with respect to the cathode during this READ mode of operation, none of the electrons directed at the target 22 from the cathode 16 will land on the insulator surfaces. Therefore, during the READ mode, the insulator surface will not discharge and, hence, the charge pattern formed there will be essentially non-destructive. However, the vacuum in the storage tube is not generally perfect, and gas molecules inside the tube—particularly those between the mesh grid 30 and the target 22—will become ionized by electron collision. These collisions will, in turn, create positive ions that will be attracted to the insulating surface, and they will slowly discharge the stored image even during the READ mode of operation. Due to the construction of the storage tube—and depending particularly on the insulator thickness, the substrate biasing, the target uniformity, the vacuum in the tube, and the type of video information stored—the target can be continuously scanned for as long as 15 minutes without a noticeable loss of stored information.

It will be seen, furthermore, that this READ time and the "storage" time are not exactly the same. The "storage" time corresponds to that length of time that the tube will retain a stored image when it is not being continuously scanned. Since the dielectric relaxation time of silicon dioxide is on the order of $5\times10^6$ seconds, once the beam is biased "off", images can be stored on the insulating surface for weeks.

During the ERASE mode of operation, the insulator voltage of the storage tube is increased so that each incremental dielectric area will be positive with respect to the cathode. Since the insulator 26 is physically attached to the substrate 24, increasing the substrate's bias from the +8 volt READ potential to a relatively higher positive voltage (e.g., +20 volts) will insure the insulator 26 is positive with respect to the cathode 16. The target is then scanned with the control grid 14 grounded until the insulator surface is discharged to approximately the cathode potential.

If the target is repeatedly scanned in the ERASE mode, the insulator 26 will continue to discharge towards an equilibrium potential whereby all of the storage elements will desirably be at the same voltage. Generally, the length of time that this target is repeatedly scanned will be 10 television frames. Because erasing of the storage target only occurs where the electron beam lands with proper electrode biasing, selective controlling of the deflection size and center of the electron beam raster will control those portions of the target as are to be erased.

After the insulator 26 has been erased, the target will be ready to store a charge pattern. With the storage tube utilized in accordance with the invention, the process is designated as a WRITE process, and is accomplished by secondary beam emission. During the WRITE operation, electrons strike the silicon dioxide insulators at a high energy potential so that the ratio of secondary electrons to primary electrons will be greater than unity. This means that the net flow of electrons will be away from the insulator, causing it to charge positively. To achieve the high impact energy needed to cause this secondary emission, the target's substrate 24 is increased from the ERASE potential of +20 volts to the WRITE potential of approximately +200 volts. This causes the insulator's potential to increase to approximately +180 volts, a voltage which is well above the value required to create secondary emission.

When a full television frame is to be stored on the target's insulator, the substrate 24 must be maintained at +200 volts for the entire frame interval. At the same time, the tube's control grid 14 is biased to a negative level of approximately −60 volts and modulates the electron beam with the one-frame video signal. While the grid modulates the beam, it also effectively controls the charge deposited on the insulator 26, and the instantaneous bias applied to the grid 14 will be inversely proportional to the charge placed on the insulator 26. Because writing occurs where the modulating beam strikes the target, to selectively record video information, the beam must first be appropriately sized and centered and the WRITE cycle then initiated.

In summary, therefore, it will be seen that a medium velocity, high current electron beam scans the insulator surface for approximately 10 television frames in the ERASE mode of operation, with the substrate 24 then being biased to approximately +20 volts and with the control grid 14 being biased to ground, the cathode potential. Additionally, it will be seen that in the WRITE mode, secondary emission is employed with a modulating, high velocity electron beam, the substrate 24 being then biased at approximately +200 volts and with the control grid 14 serving to modulate the electron beam for one television frame. Lastly, in the READ mode of operation, a low velocity electron beam is used to scan the insulators 26, the substrate then being biased at approximately +8 volts while the control grid 14 is biased to a nominal −35 volt level.

The apparatus for adjusting the target and control grid voltages of the storage tube for these hybrid and normal ERASE modes of operation includes a pair of transistors 50, 52 and a pair of potentiometers 54, 56. As will be seen, the emitter electrodes of these transistors are each connected to a point of reference or ground potential, while the collector electrode of transistor 50 (illustrated as being of P-N-P type) is directly connected to the control grid 14 of the storage tube 10. The collector electrode of transistor 52 (illustrated as being of N-P-N type), on the other hand, is coupled, first, by the potentiometer 56 and a resistor 58 to a source of operating potential $+V_1$ and, second, by means of the adjustable arm of the potentiometer 56 to one terminal A of a single pole-double throw switch 60, a second terminal B of which is coupled to the substrate 24 of the storage tube. The potentiometer 54 will further be seen to be coupled by added resistors 62, 64 between the ground point and a $-V_2$ source of operating potential, its adjustable arm being also directly connected to the storage tube control grid 14.

One each of a pair of resistors 66, 68 respectively couple to the base electrodes of transistors 50, 52, with the resistor 66 serving to couple the base electrode of transistor 50 to a third source of operating potential $-V_3$ and with the resistor 68 serving to couple the base electrode of transistor 52 to ground. Two further resistors 70, 72 are included to serially couple the base electrode of transistor 50 to a $+V_4$ source of operating potential, a capacitor 74 being also coupled in parallel across resistor 70. The junction of resistors 70, 72 is shown connected to the anode electrode of a semiconductor rectifier 76, the cathode electrode of which is connected to the collector electrode of transistor 52. Lastly, a resistor 80 is shown coupling the base electrode of transistor 52 to an "ERASE CONTROL INPUT" terminal 82, while a relay coil 84 for the switch 60 is shown coupled between another source of operating potential $+V_5$ and a "TARGET CONTROL IN- PUT" terminal 88, a semiconductor rectifier 90 being then connected across the coil 84 in the polarity illustrated.

In operation—and particularly during the preceding interval of storage tube READ control—a logic "0" signal is applied to input terminal 82 and a logic "1" signal is applied to input terminal 88. This logic "1" signal is sufficiently positive to forward bias rectifier 90, to thereby bypass relay coil 84 and maintain terminal B of the storage tube switch 60 connected to its third terminal C. This terminal C is, in turn, coupled via a resistor 92 to a third potentiometer 94 for applying a READ bias potential of some +8 volts to the substrate 24 of the storage tube. At the same time, the logic "0" signal applied to terminal 82 is such as to maintain transistors 50 and 52 non-conductive; and potentiometer 54 is adjusted to apply a nominal −35 volt READ bias potential to the control grid 14 of the storage tube.

During the hybrid mode of ERASE operation, a logic "0" signal is applied at both terminals 82 and 88. The logic "0" signal applied at terminal 88 reverse biases rectifier 90 and causes an energizing current to flow through relay coil 84, thereby connecting its terminal B to its terminal A. The logic "0" signal applied at terminal 82 in this mode continues to keep transistors 50 and 52 non-conductive. A bias potential of +200 volts is applied to the substrate 24 via resistor 58 and potentiometer 56, a voltage which will be seen to approximate that which is applied to the storage tube target when the tube is operated in its WRITE mode. With both transistors 50 and 52 non-conductive, a −35 volt potential will continue to be developed at the adjustable arm of potentiometer 54, and the voltage applied to the storage tube control grid 14 will be substantially the same as during the READ mode of storage tube operation.

It will thus be seen that in this hybrid mode of ERASE control, the substrate of the storage tube is maintained at a WRITE potential while the control grid is maintained at a READ potential. In this state, an unmodulated beam is scanned from the cathode of the tube onto its insulator elements to bring each of those elements to approximately the potential of the cathode in one or two television sweeps. At the end of this hybrid mode, the normal ERASE mode of operation follows.

In this mode, a logic "0" signal is applied at terminal 88, so as to connect switch terminals A and B. However, a logic "1" signal is now applied at terminal 82, and saturates both transistors 50 and 52. Potentiometer 56 is selected in conjunction with the values of resistor 58 and the $+V_1$ source so that, in this mode—i.e., with transistor 52 heavily conducting—, the potential applied via swtich 60 to the target 24 from its adjustable arm is reduced to approximately +20 volts. With transistor 50 similarly saturated, the potential applied to the control grid 14 of the storage tube is essentially that present at the emitter electrode of transistor 50, namely, ground. It will thus be seen that the potentials applied to the substrate 24 and to the control grid 14 during this mode are essentially those same potentials which were heretofore employed during normal ERASE situations. Scanning the insulator surface with an unmodulated scanning beam with these bias conditions will then more easily remove the stored charge pattern from the tube because, due to the hybrid mode, all insulator elements will start off at the same potential.

Potentiometers 54 and 56 are shown adjustable in order to vary the bias conditions as the characteristics of the storage tube change over periods of time and for different environmental conditions. Thus, potentiometer 54 is employed to provide adjustment of the bias on the control grid during the READ and hybrid ERASE modes of operation over a range from approximately −30 volts to approximately −60 volts. Potentiometer 56 is utilized to vary the target bias voltage during ERASE conditions from approximately 0 to approximately +20 volts.

While there has been described what is considered to be a preferred embodiment of the present invention, it will be readily apparent that other specific manners of developing bias voltages for the various components of the storage tube can be effective without departing from the teachings herein of establishing a hybrid mode of ERASE operation for storage tube control in addition to its normal ERASE mode—and in which mode, the storage tube substrate is biased to a WRITE potential while its control grid is biased to a READ level. Scanning the insulator elements with an unmodulated beam with these voltages present brings substantially all insulator elements to the same potential in a few sweeps, and facilitates subsequent ERASE procedures.

What is claimed is:

1. In an electronic storage device of the type having a target composed of a plurality of insulators arranged on a substrate, input, output, control and focus electrodes, and means for generating an electron beam for applying information signals to the target to establish a desired charge pattern representative thereof upon the writing of said information signals into storage and for thereafter detecting the charge pattern on said target upon the reading of said information signals out of storage, the combination therewith of apparatus for erasing the charge pattern from said target subsequent to the reading of said information signals from storage and prior to the writing of other information signals into storage, said apparatus comprising:

means for generating an unmodulated electron beam for scanning the insulators on said substrate;

means for applying first bias potentials to said control electrode and to said substrate during a first interval of said unmodulated scanning by said electron beam; and means for applying second bias potentials to said control electrode and to said substrate during a second interval of said unmodulated scanning by said beam, said last-mentioned means applying a more positive potential to said control electrode during said second interval of unmodulated beam scanning as compared to said first interval of unmodulated beam scanning and applying a less positive potential to said substrate during said second interval of unmodulated beam scanning as compared to said first interval of unmodulated beam scanning.

2. The apparatus of claim 1 wherein said first bias potential applying means applies its bias potentials to said control electrode and to said substrate for an interval of said unmodulated electron beam scanning which is less than the interval of said unmodulated beam scanning during which said second bias potential applying means applies its bias potentials to said control electrode and to said substrate.

3. The apparatus of claim 1 wherein said first bias potential applying means applies a bias potential to said control electrode which is comparable in magnitude to a potential similarly applied to said control electrode during the detection of a charge pattern from said target upon the reading of said information signals out of storage.

4. The apparatus of claim 3 wherein said first bias potential applying means applies a bias potential to said substrate which is comparable in magnitude to a potential similarly applied to said substrate during the establishment of a charge pattern representative of information signals upon the writing of said signals into storage.

* * * * *